United States Patent [19]
Czako et al.

[11] Patent Number: 5,664,226
[45] Date of Patent: Sep. 2, 1997

[54] SYSTEM FOR MERGING PLURALITY OF ATOMIC DATA ELEMENTS INTO SINGLE SYNCHRONIZED FILE BY ASSIGNING OUPUT RATE TO EACH CHANNEL IN RESPONSE TO PRESENTATION TIME DURATION

[75] Inventors: Brian Matthew Czako, Royal Palm Beach; William Wallis Lawton, Boca Raton; Susan Ann O'Loughlin, Tamarac; Werner Leland Sharp, Delray Beach, all of Fla.

[73] Assignee: International Business Machines Corporation, Armonk, N.Y.

[21] Appl. No.: 302,162

[22] Filed: Sep. 8, 1994

[51] Int. Cl.$^6$ .................................................. G06F 13/00
[52] U.S. Cl. ................. 395/872; 395/182.03; 395/613; 364/232 P; 364/239; 364/246.4; 711/112
[58] Field of Search .......................... 395/150, 700, 395/550, 650, 250, 182.03, 439, 600, 872; 364/239, 232.9, 246.4

[56] References Cited

U.S. PATENT DOCUMENTS

| | | | |
|---|---|---|---|
| 4,688,168 | 8/1987 | Gudaitis et al. | 364/200 |
| 4,864,562 | 9/1989 | Murakami et al. | 370/84 |
| 5,020,023 | 5/1991 | Smith | 364/900 |
| 5,121,392 | 6/1992 | Sakalian | 370/100 |
| 5,195,092 | 3/1993 | Wilson et al. | 370/94.2 |
| 5,265,248 | 11/1993 | Moulios et al. | 395/650 |
| 5,268,846 | 12/1993 | Bonsall et al. | 364/514 |
| 5,333,299 | 7/1994 | Koval et al. | 395/550 |
| 5,339,413 | 8/1994 | Koval et al. | 395/650 |
| 5,349,479 | 9/1994 | Arimura et al. | 360/73.06 |
| 5,410,698 | 4/1995 | Danneels et al. | 395/650 |
| 5,440,677 | 8/1995 | Case et al. | 395/154 |
| 5,455,910 | 10/1995 | Johnson et al. | 395/650 |

OTHER PUBLICATIONS

Ragan et al, "IEEE Transaction on Knowledge and Engineering", vol. 5, No. 4, Aug. 1993 pp. 564–572.

Primary Examiner—Thomas C. Lee
Assistant Examiner—Anderson I. Chen
Attorney, Agent, or Firm—Mark S. Walker; Andrew J. Dillon

[57] ABSTRACT

Disclosed are apparatus and methods for synchronized interleaving of multimedia data arriving from distinct sources. The invention independently buffers the incoming data streams and determines the amount of presentation time associated with each data element or byte of each data stream. The invention then draws data from the buffers at varying rates that reflect these differences, continuously presenting the withdrawn data to an interleaving module at data-streaming rates that reflect equivalent presentation-time rates. The invention also includes means for disabling synchronization when one type of data is streamed at a particularly high or low rate, resulting in buffer overload (with either the high-rate data or all data other than that transferred at the low rate).

16 Claims, 3 Drawing Sheets

SYSTEM FOR MERGING PLURALITY OF ATOMIC DATA ELEMENTS INTO SINGLE SYNCHRONIZED FILE BY ASSIGNING OUPUT RATE TO EACH CHANNEL IN RESPONSE TO PRESENTATION TIME DURATION

FIELD OF THE INVENTION

This invention relates to methods and apparatus for operating a multimedia computer platform, and in particular to facilitating dynamic, real-time formatting of captured multimedia data streams into interleaved files.

BACKGROUND OF THE INVENTION

Multimedia systems integrate multiple sources of digitally represented audio and video for simultaneous, synchronized presentation over an integrated set of output devices. For example, audio information might be stored on magnetic tape or a compact disc (CD), or obtained directly from a microphone coupled to a digital sampler; video information can originate with a videodisc, CD (possibly, although not necessarily, the same CD containing audio information), or an active digital video camera. A multimedia presentation can also include graphical components, text, and still images, all stored digitally and introduced into the presentation at appropriate times. The presentation is conveyed to a viewer over output devices capable of converting the various digital representations into their native form. Multimedia output systems can range, for example, from no more than a computer-driven video monitor and associated sound hardware to integrated high-end stereo and digital video projection systems.

Managing the equipment that permits multimedia presentations to be created from their individual audiovisual components, stored, and later retrieved for playback requires substantial processing power. The multimedia information itself can involve prodigious amounts of digital data even for relatively short presentation sequences, all of which must be handled in a manner that preserves temporal interrelationships. Ordinarily, computational responsibility for the various routing and control aspects of multimedia presentations is shared between a high-level multimedia application program, with which the user interacts to compose, edit, and view the presentation, and a multimedia operating system that performs basic, low-level operations such as data retrieval and output-device designation. This architecture simplifies the creation of multimedia applications by relieving programmers of the need to repeatedly specify routine data-handling operations at the computer system's most basic level; the multimedia operating system acts as a bridge between high-level, user-oriented application tasks and low-level input/output (I/O) and processor commands.

Recognizing the growing importance of multimedia applications, designers of basic computer operating systems have upgraded their systems to include specific facilities for multimedia support. These systems effectively have "built-in" multimedia architectures that programmers can invoke as appropriate. Representative of such systems is the IBM Multimedia Presentation Manager/2™ (MMPM/2™) supplied by International Business Machines Corporation (IBM) as an extension to its OS/2® operating system.

Among the tasks performed by MMPM/2 is capture and formatting of raw digital data from real-time peripheral devices such as cameras and digitizers. Typically, a user records audio and video with a traditional transducer device such as a microphone or video camera, which converts the sound or light-intensity pattern into an analog signal. This signal is processed into a stream of digital values by a dedicated hardware circuit, which repeatedly "samples" the magnitude of the analog signal at a rapid rate. The multimedia operating system captures the resulting data stream and stores it as a data file in a format that preserves the temporal or sequence characteristics of the recorded sounds and scenes.

Ideally, audio and video data, each of which may originate with multiple sources (and at different sampling rates), are ultimately merged into a single integrated data file, simplifying editing and playback considerably. AVI (audio/visual interleave) files, for example, contain multiple streams of different types of data temporally "interleaved" with one another. Unless steps are taken to coordinate the data streams during the interleaving process, however, the final AVI file may not reflect proper synchronization among source components.

Unfortunately, actually implementing the necessary coordination can be quite difficult due to the large amounts of data and high streaming rates that characterize even low-quality multimedia presentations. Hardware solutions, while potentially effective, involve specialized equipment that imposes costs and installation requirements. Software-based solutions have thus far proven largely ineffective. Current interleaving software frequently operates inefficiently, degrading system performance, and may also operate unreliably, producing synchronization of varying quantity when the AVI file is played back.

SUMMARY OF THE INVENTION

The invention provides for synchronized interleaving of multimedia data arriving from distinct sources by addressing the most significant source of data mismatch, namely, the fact that a byte of one type of data ordinarily does not represent the same amount of actual presentation time as a byte of a different type of data. If data is interleaved in a manner that does not specifically recognize and address this disparity, the resulting integrated file will reflect poor synchronization.

To ensure that data from different sources is synchronized when it is interleaved, the invention independently buffers the incoming data streams and determines the amount of presentation time associated with each data element or byte of each data stream. The invention then draws data from the buffers at varying rates that reflect these differences, continuously presenting the withdrawn data to an interleaving module at data-streaming rates that reflect equivalent presentation times.

In a preferred embodiment, data from each source is stored in a set of equivalently sized buffers, and data is cyclically withdrawn in buffer-length units; the respective numbers of data buffers emptied in a single cycle for each data source reflects approximate differences in per-byte presentation times, so that more buffers of high-density data will be transferred in a given cycle than will buffers of low-density data. Because relative transfer rates are computed in units of buffers rather than bytes, some deviation from the exact presentation-time ratios will frequently arise. However, such deviations are carried over to the next cycle, when they are used to compute new transfer ratios. Assuming sufficiently small buffers and data elements that represent sufficiently small slices of presentation time, viewers will barely perceive errors in transfer ratios computed on a per-buffer basis.

The invention also includes means for disabling synchronization when one type of data is streamed at a particularly high or low rate, resulting in buffer overload (with either the high-rate data or all data other than that transferred at the low rate). The invention is configured to continuously examine the buffers for incipient overloading conditions and to interleave data without synchronization until such conditions no longer persist.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENT

The present invention is best understood in the context of MMPM/2. However, while representative of the multimedia architectures with which the present invention can be employed, MMPM/2 is by no means the only such architecture. The present invention is suited to use in conjunction with any multimedia operating system that supports buffering of incoming source data, and the ensuing discussion is intended in an exemplary, rather than limiting sense.

Figure 1:
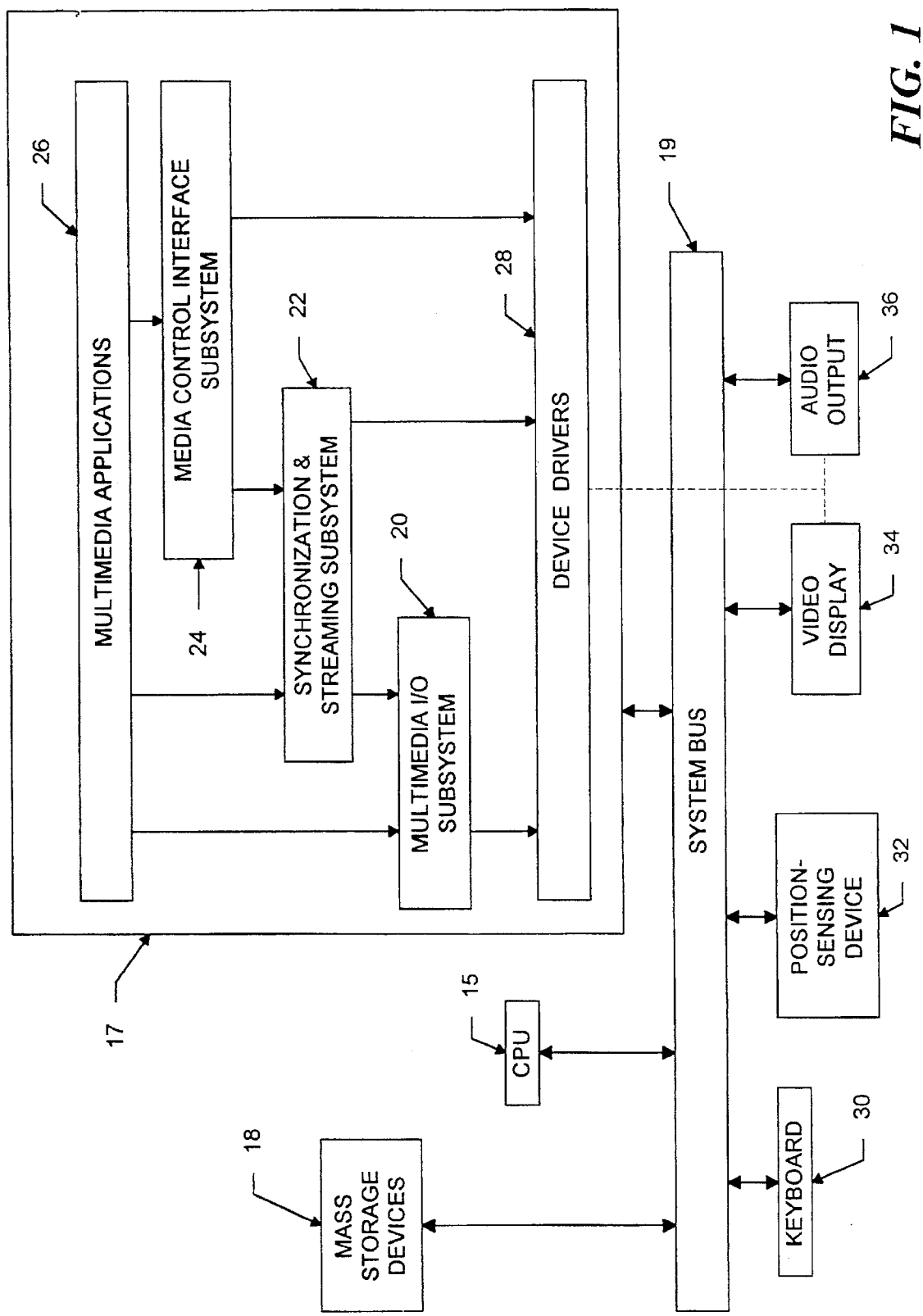
FIG. 1 schematically illustrates a representative multimedia hardware environment.

The elements of MMPM/2 and its hardware context are illustrated in FIG. 1. The computer system within which MMPM/2 operates includes a central-processing unit 15, which performs operations on and interacts with a main system memory 17 and components thereof. System memory 17 typically includes volatile or random-access memory (RAM) for temporary storage of information, including the various components of MMPM/2, buffers, and portions of the computer's basic operating system. The system typically also includes read-only memory (ROM) for permanent storage of the computer's configuration and additional portions of the basic operating system, and at least one mass storage device 18, such as a hard disk and/or CD-ROM drive. All components of the system communicate over a bidirectional system bus 19.

MMPM/2, the components of which reside in system memory 17 during operation, includes a multimedia I/O (MMIO) subsystem 20, a synchronization and streaming interface (SSI) subsystem 22, and a media control interface (MCI) subsystem 24. These three modules execute task commands issued by one or more multimedia application programs 26 and communicate directly with a series of output device drivers 28. The latter modules, which ordinarily are specific to the hardware devices they control, manage the flow of incoming data (perhaps converting it into a more appropriate form of electrical signal) and issue the control signals that actually operate the devices.

Briefly, MMIO subsystem 20 contains operating routines that simplify accessing and manipulation of the very large digital files that characterize multimedia presentations. MCI 24 manages the operation of output devices, providing multimedia applications 26 with a general interface to control multimedia devices. This enables, for example, multimedia applications 26 to designate "logical," rather than specific output devices, sending commands through either a procedural interface or a string-based command interface. MCI 24 determines and activates the most appropriate output device at a given time. SSI 22 accepts raw multimedia data from multiple sources (e.g., an audio source and a video source) and, in accordance with the present invention, interleaves the data to create integrated AVI files that may be stored in a mass storage device 18. In addition, SSI 22 provides multimedia applications 26 with the ability to obtain a constant flow of synchronized data from a mass storage device 18 and to provide this to device drivers 28. Further description of MMPM/2 is contained in MULTIMEDIA PRESENTATION MANAGER/2 PROGRAMMING GUIDE (1992), published by IBM, and U.S. Pat. No. 5,333,299 (Koval et al., SYNCHRONIZATION TECHNIQUES FOR MULTIMEDIA DATA STREAMS); the contents of both of these publications are hereby incorporated by reference.

Useful sources of raw multimedia data are numerous. Most commonly, audio data (e.g., from an analog-to-digital converter) is processed by a sound card and converted into a digitized audio signal (monophonic low-quality audio, for example, is generally sampled at 11 kHz and represented at 8 bits per sample over a single channel, while stereophonic high-quality audio is generally sampled at 44 kHz and represented at 16 bits over two channels). Video data typically originates from a camera coupled to a video capture card; a typical recording rate is 15 frames/sec.

The user interacts with the system using a keyboard 30 and a position-sensing device (e.g., a mouse) 32. The output of either device can be employed to designate information or select particular areas of a video screen display 34 when the user programs, configures or customizes multimedia applications 26. Ordinarily, interactions between the user and applications 26 are managed through a suitable graphical user interface appearing on display 34. During multimedia presentations, device drivers 28 operate video display 34 and an audio output (e.g., an amplifier and speaker) over bus 19.

Figure 2:
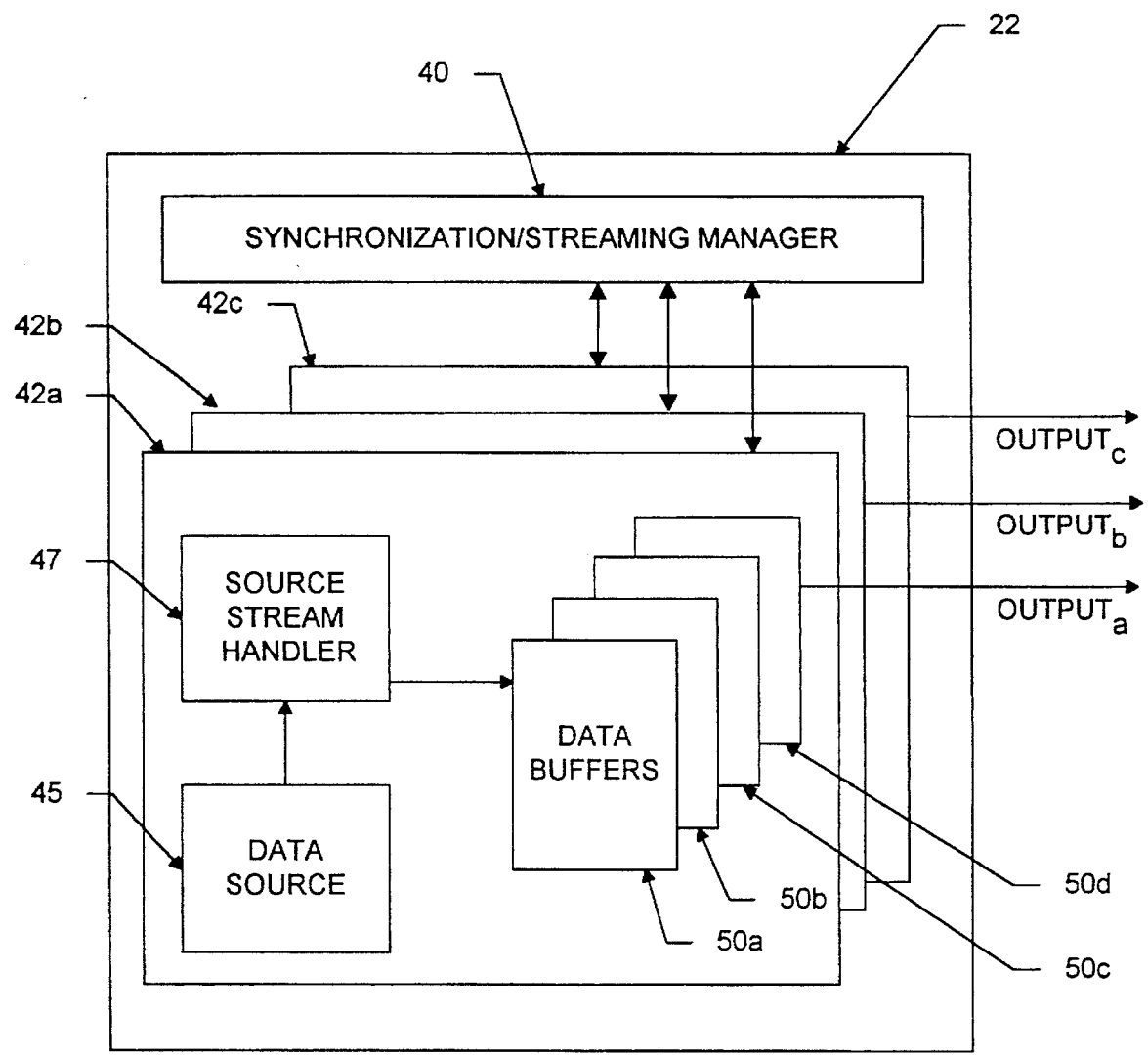
FIG. 2 schematically illustrates the components and operation of the Sychronization/Stream Interface of MMPM/2.

The operation and internal organization of SSI 22 are depicted in greater detail in FIG. 2. A synchronization/ streaming manager 40 supervises a plurality of data streaming and buffering modules, representatively indicated at 42a, 42b, 42c. Each module accepts incoming digital multimedia data from a separate source 45 (e.g., audio source or video source, or a data file stored on a mass storage device 18). The streams of data are transferred by a stream handler 47 to a series of data buffers, representatively indicated at 50a, 50b, 50c, 50d. Stream handler 47 draws data from the buffers in a manner that preserves the temporal flow pattern of the presentation it represents, routing the data either to a device driver 28 or, in the case of the present invention, to components that merge it with data from other buffer sets.

The data buffers themselves are partitions of system memory 17, designated and allocated by manager 40 as described in the '299 patent. The size and number of buffers 50, as well as the rate at which they fill with data, depend on the type of data retrieved by source stream handler 47. Each atomic element of multimedia data represents a specific time segment or "slice" of a particular presentation component. The duration of that segment depends on the sampling rate; conventionally, time slices are represented in MMTIME units of 1/3000 sec. The size of the atomic element depends on the number of bits used to represent each sample, with higher-quality data representations requiring larger atomic elements. Thus, for example, each sample of low-quality, single-channel audio digitized at 11025 samples/sec at 8 bits/sample represents an 8-bit atomic data element occupying 0.272 MMTIME units.

Buffer sizing for various types of data is discussed in the '299 patent and in MULTIMEDIA PRESENTATION MANAGER/2 PROGRAMMING GUIDE. As an example, a preferred audio buffer size is 4096 8-bit bytes; for the low-quality, single-channel audio data discussed above, such a buffer would store a segment of about 1115 MMTIME units.

Figure 3:
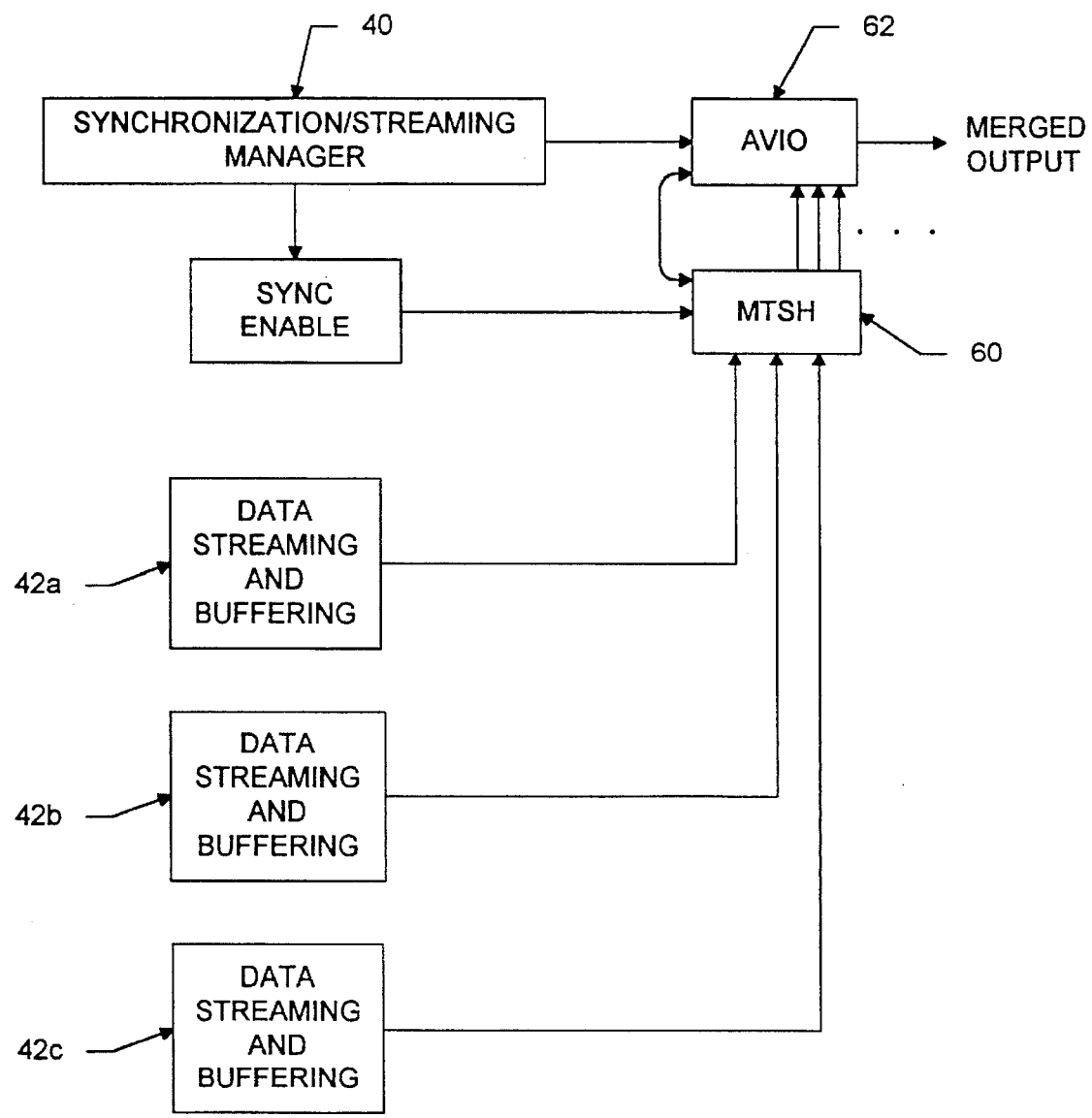
FIG. 3 schematically illustrates a representative implementation of the present invention.

The components and operation of the invention (in the illustrative context of MMPM/2) are illustrated in FIG. 3. A multitrack system handler 60 accepts data streams from data streaming and buffering modules 42a, 42b, 42c and passes these to an AVI I/O (AVIO) module 62. Module 62 integrates these, in accordance with well-known techniques, into an AVI interleaved output. This output can be stored on a mass storage device 18, presented on output devices 38 and 40 for immediate review, or otherwise handled.

Data transfer and output are controlled by manager 40, which can respond to user commands, default processing conditions and/or commands embedded within one of the data streams. When a specified number of buffers (or a specified portion of a single large buffer) have been filled, the data becomes eligible for transfer to MTSH 60. If data synchronization is enabled, MTSH 60 and AVIO 62 interoperate to ensure that the data streams arrive at AVIO 62 in a temporally aligned manner; otherwise, data is interleaved as it is received by AVIO 62 without regard to synchronization.

To achieve synchronization, prior to transferring any data MTSH 60 determines the type of data associated with each streaming and buffering module; specifically, it assesses the temporal duration associated with each atomic element of data. AVIO 62 then converts the atomic elements of data to a common unit (ordinarily a byte), determining the per-byte temporal duration associated with each data stream, and calculates ratios that relate these temporal durations to one another. For simplicity, the ratios are preferably normalized to the stream with the smallest time slice per byte (i.e., the greatest sampling rate). Having established this relationship among data types, AVIO 62 directs MTSH 60 to deliver data to AVIO 62 at a rate corresponding to the calculated ratios.

This is most easily appreciated, and the invention is most straightforwardly implemented, on a per-buffer transfer basis. Assume, pursuant to an earlier example, that module 42a handles low-quality, single-channel audio digitized at 11025 samples/sec at 8 bits/sample; that module 42b handles video at 15 frames/sec, with each frame requiring 4096 8-bit bytes; and that the buffer size is 4096 8-bit bytes. At 15 frames/sec, each buffer associated with module 42b holds ⅟₁₅ sec, or 200 MMTIME, of video information; and as discussed previously, each buffer associated with module 42a holds about 1115 MMTIME units of audio information. From these parameters, AVIO 62 determines a ratio of 1115:200, so that about 5 buffers from module 42b are temporally equivalent to a single buffer from module 42a.

MTSH 60 and AVIO 62 operate cyclically based on a buffer ratio computed in this manner. During the first cycle, MTSH 60 obtains 5 buffers of video from module 42b and 1 buffer of audio from module 42a, passing the contents of these buffers in a steady and coordinated progression to AVIO 62 such that the final byte of the last of the 5 buffers from module 42b arrives at AVIO 62 simultaneously with the final byte of the sole buffer from module 42a. Data therefore streams from MTSH 60 at rates corresponding to equivalent output rates of presentation time segments.

The result, after this first cycle, is that 115 MMTIME units of audio are "left over"; although this data should have been merged with the single buffer of video, it was not merged because data is transferred in buffer-length units. So long as the buffers are sufficiently small and sampling rates sufficiently high, this transfer error will barely be perceived by a user. (Of course, it is possible to avoid error entirely by transferring information on a per-byte, rather than per-buffer basis.)

AVIO 62 accumulates the left-over time, calculating a new ratio for the next cycle based on an "extra" 115 MMTIME units. During this cycle, MTSH 60 merges 6 (rather than 5) buffers of video with a single buffer of audio, resulting in a carryover of 30 MMTIME units of audio; once again, this quantity is utilized in computing the ratio for the succeeding cycle.

The present invention operates most effectively when the buffers associated with each data streaming and buffering module fill at equivalent (in terms of presentation time segments rather than bytes) rates. Special video processing techniques, in particular compression, can substantially slow the progression of data into the video buffers. Because the other data streaming and buffering modules have been assigned to them only a finite number of buffers, it is possible that the slow progress of video information will result in other module buffers becoming overloaded before a single video buffer is ready to be emptied. To avoid loss of data, MTSH 60 monitors all buffers and, if it detects a likely overload condition (e.g., should more than 75% of the buffers available for a particular stream become filled), overrides the sync enable condition, transmitting data to AVIO 62 without synchronization until the condition no longer exists.

It will therefore be seen that the foregoing represents a highly advantageous approach to real-time, dynamic interleaving of multimedia data streams. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits.

What is claimed is:

1. Apparatus for dynamically interleaving multiple streams of multimedia data into a single, integrated data file, said apparatus comprising:

a plurality of sources of visual or audio data collectively representative of a presentation having a temporal flow pattern, the data from each of said plurality of sources originating as an ordered series of atomic data elements, each representative of a visual or audio presentation time segment, wherein atomic data elements from each diverse source of visual or audio data comprise different amounts of data;

at least one memory buffer associated with each data source for accumulating presentation data in a manner that preserves the temporal flow pattern;

handler means for obtaining data from each data source and storing the data in said at least one memory buffer associated with each data source and for extracting data from said at least one buffer as a separate data stream when a specified number of buffers for that data source have been filled, said specified number relating to an amount of data within each atomic data element from that data source;

synchronization means for temporally aligning the data streams, said synchronization means comprising:

multi-channel input means for accepting a data stream for each data source from said handler means;

means for determining, for each data stream, a presentation time duration associated with each atomic data element;

variable-rate, multi-channel output means for transmitting each accepted data stream at a streaming rate; and control means for assigning an output rate to each output channel in response to a determined presentation time duration such that the streaming rates correspond to equivalent output rates of presentation time segments; and means for merging the synchronized data into a single integrated data file.

2. The apparatus according to claim 1 wherein:

said at least one buffer associated with each data source comprises a plurality of buffers;

each data element corresponds to a quantity of data bytes; and said handler means cyclicly transfers data in buffer-length units, the number of buffers that each handler means transfers to said synchronization means at each cycle being determined by said control means based upon differences in per-byte presentation times associated with each data source.

3. The apparatus of claim 2 wherein the data transferred during each cycle represents an aggregate presentation time, and mismatches in aggregate presentation times, which arise from outputting in buffer-length units, are accumulated by the control means until the succeeding cycle, and are thereupon used by the control means in determining the number of buffers to be transferred by each transfer means during that cycle.

4. The apparatus of claim 1 further comprising a storage device for storing the integrated data file.

5. The apparatus of claim 1 further comprising audiovisual presentation means for playing the integrated data file.

6. The apparatus of claim 1 wherein each source of data is a real-time input device.

7. The apparatus of claim 1 wherein the sources of data are data files contained on at least one mass storage device.

8. The apparatus of claim 1 further comprising means for disabling synchronization upon detection of imminent overload conditions in one of the at least one buffers.

9. A method of dynamically interleaving multiple streams of multimedia data into a single, integrated data file, said method comprising the steps of:

providing a plurality of sources of visual or audio data collectively representative of a presentation having a temporal flow pattern, said data originating as an ordered series of atomic data elements, each representative of a visual or audio presentation time segment wherein atomic data elements from each diverse source of visual or audio data comprise different amounts of data;

buffering said data associated with each data source in at least one buffer associated with said data source;

extracting data from said at least one buffer as a separate data stream when a specified number of buffers for each source have been filled, said specified number relating to an amount of data within each atomic data element from each data source;

synchronizing said extracted data according to steps comprising:

determining, for each data stream, a presentation time associated with each atomic data element;

coordinating said data streams such that the streaming rates corresponding equivalent output rates of presentation time segments, including specifying said specified number of buffers for each source; and merging said synchronized data into a single integrated data file.

10. The method according to claim 9 wherein:

said at least one buffer associated with each data source comprises a plurality of buffers;

each data element corresponds to a quantity of data bytes; and data is cyclicly extracted in buffer-length units, the number of buffers extracted from each data source in each cycle being determined by differences in per-byte presentation times associated with each data source.

11. The method of claim 10 wherein the data extracted during each cycle represents an aggregate presentation time, and mismatches in aggregate presentation times, which arise from outputting in buffer-length units, are accumulated by the control means until the succeeding cycle, and are thereupon used by the control means in determining the number of buffers to be transferred by each transfer means during that cycle.

12. The method of claim 9 further comprising the step of storing the integrated data file in a storage device.

13. The method of claim 9 further comprising the step of playing the integrated data on an audiovisual presentation means.

14. The method of claim 9 wherein each source of data is a real-time input device.

15. The method of claim 9 wherein the sources of data are data files contained on at least one mass storage device.

16. The method of claim 9 further comprising the steps of analyzing the buffers for an imminent overload condition and, upon detection of such a condition, disabling synchronization.

* * * * *